Dec. 11, 1962    M. S. SMITH    3,068,049
RIM-LOAD DUAL WHEEL KIT
Filed June 12, 1961

INVENTOR
Marion S. Smith

United States Patent Office 3,068,049
Patented Dec. 11, 1962

3,068,049
RIM-LOAD DUAL WHEEL KIT
Marion S. Smith, P.O. Box 2144, Milan Station, Grants, N. Mex.
Filed June 12, 1961, Ser. No. 116,387
3 Claims. (Cl. 301—36)

This invention relates generally to the mounting of vehicle wheels, and more specifically to the conversion of a single wheel axle to a double wheel axle.

Circumstances frequently arise when it is preferable to have a dual wheel traction for the temporary conveyance of heavy loads, or to merely increase the traction of the vehicle when operating over poor ground conditions. It would therefore be expedient to have some simple means whereby a second wheel may be conveniently and simply mounted in tandem with the conventional wheel in order to achieve this objective. In the past, attempts have been made to provide such a means of supplementary wheel attachment, but these have not proved successful due principally to the lack of alignment of the supplementary wheel caused by inadequate and ineffective mounting procedures. Another problem which has been found with such devices is that they require modification to the existing hub or wheel structure.

It is therefore a primary object of this invention to provide a supplementary wheel attachment device wherein no modification to the existing wheel or hub structure is necessary, and wherein the supplementary wheel is automatically aligned in both axial and radial planes.

It is a further object of this invention to provide a rim loaded supplementary wheel attachment device which comprises a minimum of components enabling rapid assembly as required.

It is a still further object of this invention to provide a vehicle wheel conversion kit for the purposes above set forth, which may be used in conjunction with conventional vehicle wheels without modification thereto, and wherein the components may be manufactured at reasonable cost.

Briefly, my invention involves the provision of a wheel hub adaptor which is mounted over the wheel studs inwardly of the wheel. The adaptor has a projecting boss which extends through the inside wheel and provides a concentric mandrel upon which the outside wheel may be mounted and secured. A spreader or transfer ring is disposed intermediate the two wheels and is adapted to engage within the periphery of the outer rim of opposed wheels, thereby ensuring their precise alignment with respect to each other.

A full understanding of the construction of this invention, together with further novel features and advantages, will be had from the following detailed description of a preferred embodiment thereof, taken in conjunction with the attached drawings wherein.

Similar reference characters indicate corresponding parts throughout the several views in the drawings.

Figure 1:
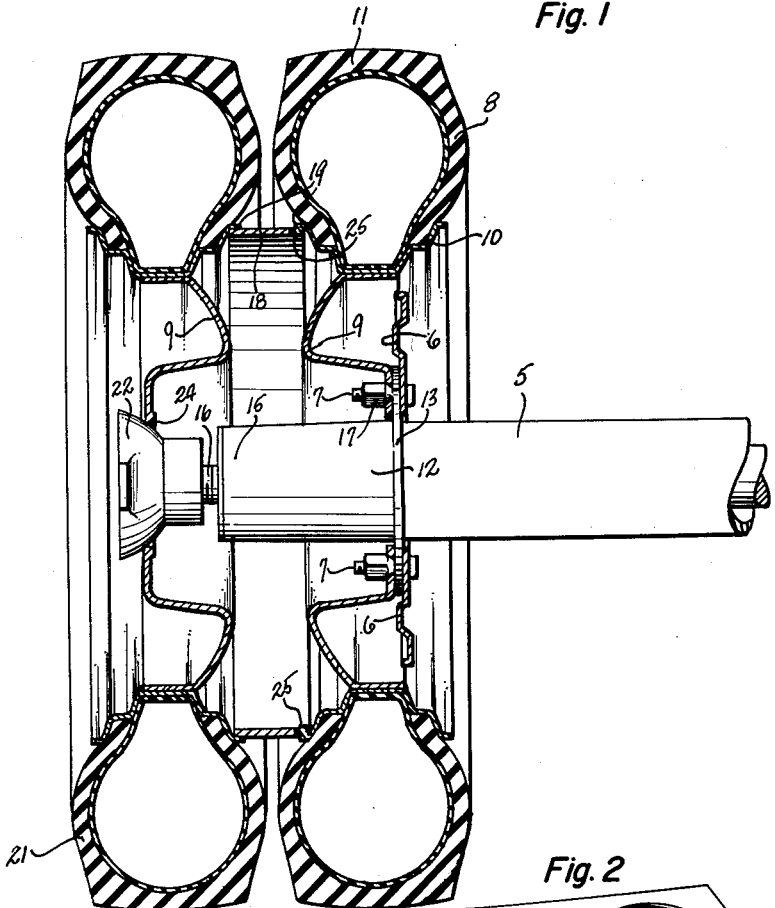
FIG. 1 is a cross sectional side elevation showing two wheels secured together in accordance with my invention.
Figure 2:
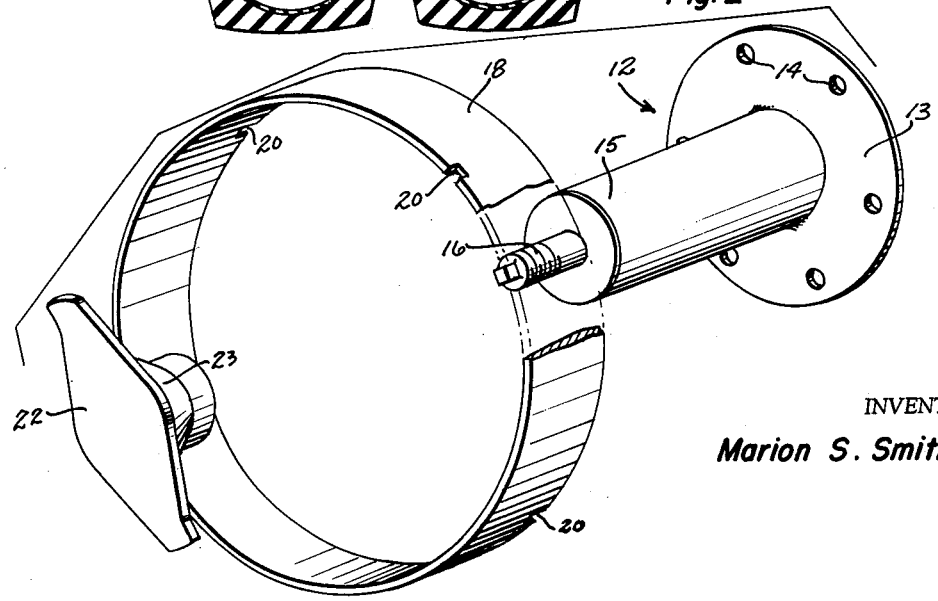
FIG. 2 is an exploded perspective view showing the three supplementary components utilized in achieving the conversion from a single wheeled vehicle to a double wheeled vehicle.

Referring now to the drawings in detail, the numeral 5 represents the rear axle of a vehicle and showing the front face 6 of a conventional brake drum which is secured for rotation with the axle. Conventional studs 7 project normally from the front face 6 of the brake drum for mounting a regular vehicle wheel such as 8 thereon. The vehicle wheels have a concentric mounting disc 9 which mount outwardly projecting tire rims 10 for receiving conventional tires such as 11.

An axle extension or adaptor 12 consists of a circular disc 13 having holes 14 spaced about the periphery and adapted to register with the studs 7 on the brake drum. Projecting concentrically and normally with respect to the disc is a mandrel 15 which terminates outwardly with a threaded boss 16. The disc 13 of the adaptor 12 is located in position over the studs 7 and the wheel 8 is then mounted and secured by means of nuts 17 such that the mandrel protrudes through the wheel disc and extends therebeyond. A spreader or transfer ring 18 consists of plain cylindrical ring adapted to accurately locate inwardly of the respective outer ribs 19 of the tire rims 10. The transfer ring may be provided with diametrically opposed notches 20 formed inwardly of the axially inner and outer peripheral edge of the ring and adapted to register with small lugs 25, welded at similarly oriented points around the outer ribs 19 of the respective rims. These notches ensure a positive non-slip relationship between the transfer ring and the tire rim.

The outer or supplementary wheel 21 is mounted over the projecting edge of the transfer ring in a reversed orientation, such that the wheel discs 9 protrude inwardly towards each other. The supplementary or outer wheel 21 is secured in position by a knock off type retaining nut 22 adapted to threadably engage on the boss 16 of the adaptor 12. The retaining nut has a tapering peripheral surface 23 which is adapted to register and engage within the concentric opening 24 conventionally formed in the centre of the wheel disc.

It will be clear that once the adaptor has been mounted in position, it is an exceedingly simple and rapid operation to mount the supplementary wheel by positioning the transfer ring 18 and mounting the supplementary wheel in a reversed manner over the ring, and subsequently locking the same by means of the quick release type retaining nut 22.

Having described the invention in a preferred form, it will be appreciated that some modifications may be made to the precise configuration, without departing from the scope or spirit of the invention, as defined by the following claims.

I claim:
1. A rim loaded dual wheel assembly, comprising, an axle having a brake drum mounted at one end, a wheel having a tire rim and a central opening mounted on studs projecting normally from the brake drum, an adaptor having a circular disc mounted on the studs intermediate the drum and the wheel, a mandrel projecting concentrically and normally from the disc and through the central opening of the wheel, a transfer ring engaging the tire rim of the wheel and projecting axially and engaging the tire rim of a supplementary wheel, said mandrel terminating with a threaded boss disposed axially inwardly of a central opening in the supplementary wheel, and a retaining nut extending through the central opening of said supplementary wheel and engaging the threaded boss to re- tain the same in a fixed and spaced relationship with respect to the first mentioned wheel.

2. A rim loaded dual wheel assembly according to claim 1, wherein the transfer ring is provided on its axially inner and outer edges with diametrically opposed notches, lugs projecting from the tire rims and adapted to register with the notches to ensure a positive non-slip relationship between the wheel and the ring.

3. A rim loadetd dual wheel assembly according to claim 1, wherein the supplementary wheel is mounted in a reverse manner on the transfer ring, and wherein the retaining nut has an inwardly tapering surface for engaging with the central opening of the supplementary wheel.

References Cited in the file of this patent

UNITED STATES PATENTS

| | | |
|---|---|---|
| 1,364,327 | Slaymaker | Jan. 4, 1921 |
| 1,428,556 | Putnam | Sept. 12, 1922 |
| 1,590,774 | Moore | June 29, 1926 |
| 1,901,078 | Bourdon | Mar. 14, 1933 |
| 2,635,012 | Rappaport | Apr. 14, 1953 |

FOREIGN PATENTS

| | | |
|---|---|---|
| 1,133,321 | France | Nov. 19, 1956 |